Figure 1:
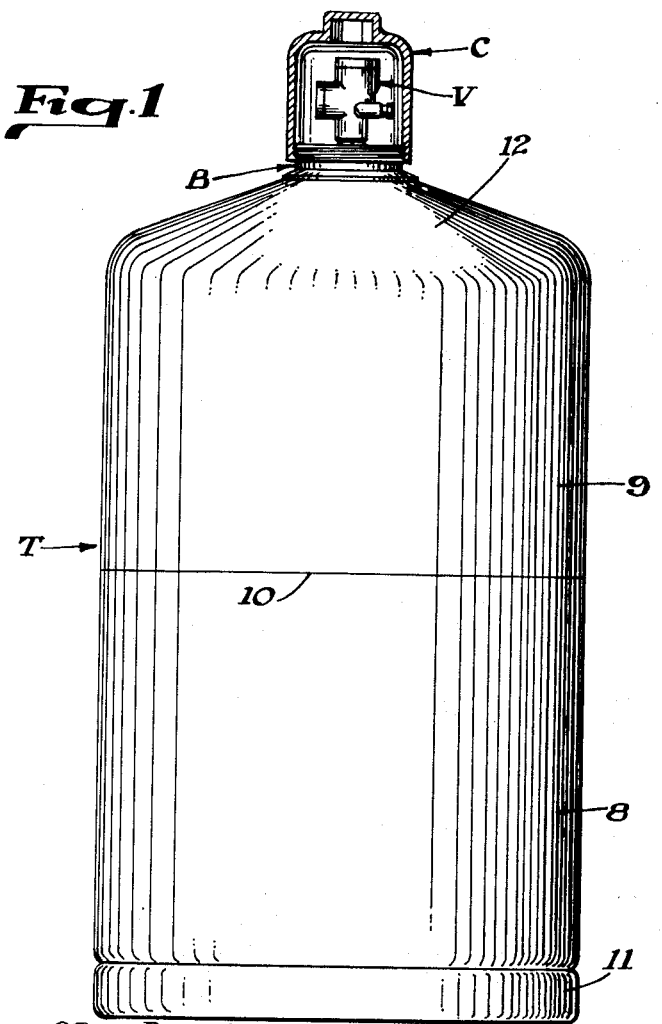

Dec. 29, 1953  
L. O. KING  
2,664,222  
CYLINDER BOSS ASSEMBLY  
Filed Aug. 24, 1949

INVENTOR.
LEWIS O. KING.

BY

*Richey & Watts*
ATTORNEYS.

Patented Dec. 29, 1953

2,664,222

UNITED STATES PATENT OFFICE 2,664,222

CYLINDER BOSS ASSEMBLY

Lewis O. King, Willoughby, Ohio, assignor to The Weatherhead Company, Cleveland, Ohio, a corporation of Ohio Application August 24, 1949, Serial No. 112,117

2 Claims. (Cl. 220—66)

1

This invention relates to containers for fluid under pressure and more particularly to such containers including a novel cylinder boss assembly.

Pressure vessels such as those employed to contain and transport liquefied petroleum are subject to strict regulations and must conform to rigid strength requirements. It is an object of the present invention to reduce the cost of manufacture of such vessels which include a cylinder boss for reception of a valve and which may be formed to receive a cover for protecting the valve. More particularly, it is an object of the invention to provide a cylinder boss assembly that is simply and economically manufactured by the use of standard machines, has ample strength, and is not weakened by threads provided for mounting a protective cap nor by markings stamped on the assembly.

Another object resides in providing an economically fabricated boss of composite construction which is readily adaptable for permanent uniting of parts by a furnace brazing operation.

Cylinder bosses for the type of service referred to above have been formerly machined from a thickened portion of the cylinder itself or have been machined from forgings or from solid stock and welded to the pressure vessel. I have found that I can materially reduce the cost of the assembly without decreasing its strength and reliability by forming the boss as a composite member stamped from sheet material of the same gauge as that of the vessel body or scrap arising from the formation of the pressure vessel may be employed for the boss. This is accomplished by forming the boss as a pair of drawn cups stamped from the aforesaid stock with the cups telescoped and in intimate engagement with one another. One of the cups is flanged for lap welding with the pressure cylinder and the other externally threaded to accommodate a cap without weakening the boss relative to the strength of the pressure vessel.

Means are simply and economically provided for mounting a valve in the boss comprising an internally threaded collar formed on a lathe or screw machine and brazed in place in the bottom of the cup, the brazing taking place simultaneously with the operation that brazes the sheet metal cups together. The welding operation that joins the boss to the cylinder is performed after the boss is brazed into a unitary member.

Another feature of the invention resides in forming the radius of curvature of the bottom corner of the inner cup so that it is greater than

2 that of the outer cup and placing a ring of brazing wire in the space resulting from that structure. As a result, the brazing operation is readily effected and perfect distribution of the brazing metal about all joints between the parts is assured.

The manner in which these objects and advantages and others apparent to those skilled in the art may be accomplished will be readily understood from the following detailed description of a preferred embodiment of the invention.

Figure 2:
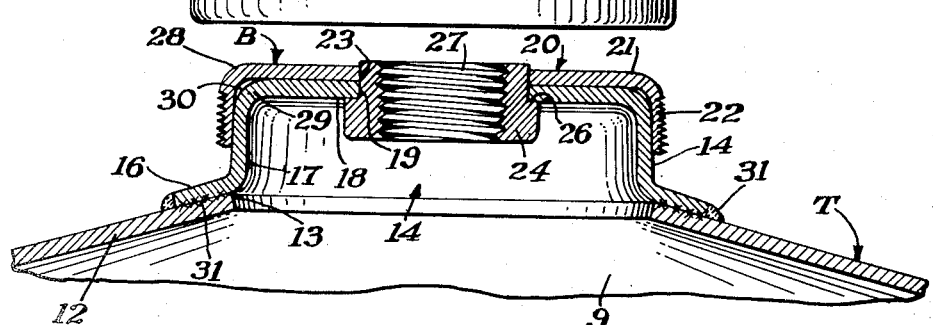

In the drawings:

Fig. 1 shows a typical application of the invention to the type of tank used to transport liquefied petroleum gas; and, Fig. 2 is a fragmentary section through the portion of the tank that includes the cylinder boss.

As seen in Fig. 1, a typical tank T may include a lower section 8 and an upper section 9, the sections being welded together as at 10 there usually being a base 11 welded to the lower section. The cylinder boss B is welded to the upper section of the tank and may be formed to mount a valve V for filling and dispensing the tank, the valve being protected by a cap C threaded to the boss.

Referring to Fig. 2 the boss B is shown attached to the end flange 12 of the tank which has a central aperture 13 formed therein. The boss B includes a first cup-shaped member 14 stamped from a blank of the same gauge as that employed to make the tank T. For example, where the tank T is drawn from stampings member 14 may be made from a blank punched from the scrap between the tank stampings. Cup 14 is drawn so as to form a cup having a flanged rim 16, cylindrical side walls 17, and a bottom wall 18, the latter being apertured as at 19. The boss includes the second cup member 20 having a bottom wall 21 and an externally threaded side wall 22, cup 20 being telescoped with cup 14 with the bottom and side walls of the cup in intimate engagement. Cup 20 has an aperture 23 in line with the aperture 19 in the other cup.

The boss assembly also includes a threaded collar 24 which may be machined from bar or tube stock on a lathe or screw machine. The collar is necked down to extend through apertures 19 and 23 to form a stop shoulder 26 that locates the collar in the apertures. The collar is internally threaded as at 27 before it is assembled with the cups. The cup 20 has what may be termed a bottom corner 28 having one radius of curvature, and cup 14 has a bottom corner 29 of greater radius of curvature than that of the other cup.

The boss assembly is made unitary before it is attached to the pressure tank. The two cups are telescoped together and a ring of copper wire or other brazing material is included in the space 30 between the two corners of the cups. The collar 24 is then pressed into place in the cup apertures and copper or copper paste included in the joint.

The entire assembly is then heated above the melting point of the brazing material, preferably in a continuous brazing furnace. When the parts are brought up to the proper temperature the brazing material melts and flashes in both directions, firmly bonding the intimately engaging parts of the boss together. It is noted that the brazing material in the corner cannot be dislodged prior to the brazing operation and that since it is relatively centrally located, a single ring of copper wire melting or spreading in both directions suffices for the entire brazing job except for the collar joint. This reduces the time and labor required to prepare the article for brazing. After the boss assembly is completed, flanged rim 16 thereof is lap welded to the end flange 12 of the pressure vessel as indicated at 31.

It will now be apparent wherein the advantages previously described are obtained by the invention. At no area is the boss weaker than the cylinder itself and at several areas it is stronger than the cylinder. This is accomplished despite the fact that the boss is exteriorly threaded, and the boss may be formed by simple punching or stamping operations from scrap stock left over from the manufacture of the cylinder members. The cups are readily formed by conventional pressing and punching apparatus with little difficulty, and the collar is rapidly and economically made in a screw machine. Thus, there is no requirement that the boss assembly nor the tank be placed in other machine tools for formation of the boss.

Flange 16 also provides a surface for the stamping of government or other regulations which stamping, as indicated, does not in the slightest way reduce the maximum strength of the pressure vessel. Since the material of the stamping 14 and the tank 12 is the same or at least of the same gauge no difficulty is encountered due to burning of one or the other members during the welding operation.

Having completed a detailed description of my invention so that others may practice the same, I contemplate that the scope of my invention be determined by the appended claims.

What is claimed is:

1. A pressure cylinder boss comprising a first cup-shaped member having an apertured bottom wall and a radially outwardly extending flanged rim, a second cup-shaped member having an apertured bottom wall overlying and engaging the bottom wall of said first member and having a side portion surrounding and engaging with the side of said first member, an internally threaded collar having a necked down portion extending through said member apertures, the radius of curvature of the intersection of said bottom and side portion of said first cup exceeding that of the second cup, said members and collars being brazed together to form a unitary cylinder boss.

2. A pressure cylinder boss comprising a first cup-shaped member having an apertured bottom wall and a radially, outwardly extending flanged rim, a second cup-shaped member having an apertured bottom wall overlying and engaging the bottom wall of said first member and having a side portion surrounding and engaging with the side of said first member, an internally threaded collar having a necked down portion extending through said member apertures, the radius of curvature of the bottom corner of said first cup exceeding that of the second cup, brazing material disposed in space between said bottom corner of said cups, said members and collars being brazed together to form a unitary cylinder boss.

LEWIS O. KING.

References Cited in the file of this patent

UNITED STATES PATENTS

| Number | Name | Date |
|---|---|---|
| 368,611 | Pratt | Aug. 23, 1887 |
| 1,948,953 | Wayer et al. | Feb. 27, 1934 |
| 1,948,966 | Jaeyer | Feb. 27, 1934 |
| 2,113,060 | Sandberg | Apr. 5, 1938 |
| 2,333,968 | Winter | Nov. 9, 1943 |
| 2,366,141 | Alderfer | Dec. 26, 1944 |
| 2,386,246 | Mapes | Oct. 9, 1945 |
| 2,421,460 | Merker et al. | June 3, 1947 |

FOREIGN PATENTS

| Number | Country | Date |
|---|---|---|
| 11,059 | Great Britain | of 1915 |
| 348,285 | Great Britain | May 14, 1931 |